Patented Jan. 3, 1950

2,493,427

UNITED STATES PATENT OFFICE 2,493,427

STABILIZATION OF HALOGENATED ORGANIC COMPOUNDS

Robert M. Thomas, South Charleston, W. Va., assignor to Food Machinery and Chemical Corporation, New York, N. Y., a corporation of Delaware No Drawing. Application May 15, 1946, Serial No. 670,046

1 Claim. (Cl. 260—651)

This invention relates to a process for preventing the deterioration of benzyl chloride and other halogenated organic compounds having a tendency to deteriorate on storage due primarily to auto-condensation, i. e., the reaction of some of the molecules with other like molecules therein in the presence of catalytic impurities. It also relates to compositions of matter containing such organic compounds together with small amounts of organic amines or other stabilization agents hereinafter described.

Benzyl chloride and other like compounds appear to be relatively stable when in pure condition. However, commercial methods of producing and handling such compounds lead to the presence of impurities which catalyze a hydrogen halide-liberating condensation reaction therein resulting in deterioration and eventually to resinification. Various metals and metal salts are quite active catalysts, examples being ferric chloride and metallic iron. Catalytic agents may even be picked up by benzyl chloride when the same is contacted with various gasket materials and stopcock lubricants. Because of the high activity of such catalysts their presence in low concentration in benzyl chloride has often remained undetected. This has led to the assertion, apparently untrue, that benzyl chloride is unstable even in the absence of any catalysts.

Benzyl chloride is normally prepared by the chlorination of toluene leading to a product having therein a proportion of benzal chloride and benzotrichloride along with the benzyl chloride. This commercial product on storage tends to undergo undesirable condensation or decomposition, or both, and it sometimes develops a dark color. These objectionable reactions may occur not only during the storage and handling but also during separation of benzyl chloride or other desired product from the mixture of compounds obtained in the chlorination of the toluene.

Heretofore when benzyl chloride has been shipped in iron drums it has been customary to mix therein an aqueous solution of an alkali such as sodium carbonate to prevent the hereinbefore mentioned deterioration. Since the benzyl chloride is frequently used in industrial applications in a water-free condition, it is necessary for the customer receiving such product to separate the benzyl chloride from the water or alkali solution. For a customer desiring to purchase benzyl chloride in a condition free of water, anhydrous benzyl chloride has sometimes been stored and shipped in more expensive containers constructed of glass, enamelware, lead or silver, such materials being devoid of catalytic activity.

The primary purpose of the present invention is to provide a process, not requiring the use of water or aqueous solutions, for the stabilization of benzyl chloride and other halogenated organic compounds against condensation or resinification and other deteriorative activity either during their production or during subsequent storage and handling even in the presence of iron and other active catalytic impurities.

Broadly considered, the present invention involves a process for the prevention of the autocondensation and deterioration of benzyl chloride and other easily condensed halogenated organic compounds in the presence of catalytic impurities by incorporating in said halogenated organic compound an organic amine in a small amount. Amines, as a class, appear to be operable. A large number of them of diverse structure have been tested and found to be operable. Among those tested were members of the aliphatic, aromatic, cycloaliphatic and heterocyclic classes.

Example 1

A commercial grade of benzyl chloride containing catalytic impurities was mixed with 0.007 per cent by weight of di-2-ethylhexylamine. To test the stability of the resulting mixture it was heated for eight hours under reflux condensation. Only a very small amount of decomposition occurred even in this severe test. It amounted to only a few tenths of one per cent. Without such addition, the benzyl chloride under the same treatment decomposed and condensed in the amount of about 65 per cent. Other tests adding up to 0.5 per cent of this same stabilizer led to no significant differences in the stability of the benzyl chloride samples obtained, as compared with the sample adding only the very small amount, thereby indicating that variations in the concentration of the amine stabilizer within rather wide limits are of no consequence.

The di-2-ethylhexylamine is particularly effective not only because of the small amount required but because it is readily soluble in benzyl chloride and imparts relatively little color to the stabilized material.

Example 2

A commercial grade of benzyl chloride produced by the chlorination of toluene and containing catalytic impurities was mixed with 0.10 per cent by weight of aniline. Whereas the resulting composition was not as stable as that produced by the process of Example 1, the amount of condensation and deterioration was negligible.

Other basic nitrogenous organic compounds tested and found active as stabilizers include:

Monoethanolamine
Diethanolamine
Diethylamine
Triethylamine
Di-n-propylamine
Tri-n-propylamine
Di-n-butylamine
Tri-n-butylamine
Triamylamine
Mono-n-dodecylamine
Triethylene tetramine
Diethylene triamine
Diphenylamine
2,4-diaminodiphenylamine
o-Aminophenol
o-Benzylaminophenol
2,6-dimethylmorpholine
Alpha-phenylmorpholine
Cyclohexylamine The minimum concentration of the amines required in the benzyl chloride or other halogenated organic compound to be stabilized varies with the particular amine selected. Generally from 0.005% to 1% of the amines have resulted in effective stabilization. A useful amount of stabilization with many amines can be obtained with concentrations as low as 0.0005%. Concentrations at as high as 10% have been tried and found effective. With any specific amine the most efficient amount can be easily determined by test.

The stabilizers herein described may be used satisfactorily both during the rectification of benzyl chloride from crude reaction mixtures and during shipment of the purified product in iron drums, no soda ash solution being required to prevent the deterioration.

In practising the present invention the particular amine selected will depend upon a number of factors including the cost of the amine, its color imparting effect and possibly the use to which the benzyl chloride will be put. Since most amines impart some color to the benzyl chloride, it is sometimes desirable to select either an amine not having objectionable color or an amine so effective that the small amount required will not impart sufficient color to the benzyl chloride to be objectionable.

Another class of compounds tested and found operable comprise the ethers. Examples are dioxane, pyrone and the like. Their stabilization action, however, is generally weaker than that of the amines and decidedly less than the preferred amines.

The complete action of the amines or other stabilizing agents in preventing the condensation and deterioration of the benzyl chloride and other halogenated compounds is not understood. Since very small amounts of the stabilizers are frequently operable, it does not appear that the action involves simply the neutralization of any halogen halide liberated during condensation.

The present invention should not be confused with processes heretofore suggested for the prevention of the deterioration, by the formation of unsaturated compounds, of various inherently unstable halogenated compounds having a tendency to split off hydrogen halides, which processes involve the use of certain specific amines said to have the property of neutralizing hydrogen halide split off from the halogenated substance. The present invention also should not be confused with processes for preventing the discoloration of various aliphatic hydrocarbons during halogenation. The instant invention is concerned only with the treatment of benzyl chloride and like compounds having a tendency to condense and deteriorate in the presence of catalytic impurities frequently picked up in handling and storage.

The amines of the present invention have the advantage that they produce compositions of matter with the benzyl chloride or other organic compounds which are stable against auto-condensation and deterioration both at ordinary temperature and at elevated temperatures even up to the boiling point.

It should be understood that the present invention is not limited to the specific compounds and compositions herein described but that it extends to all equivalents which will occur to those skilled in the art upon consideration of the scope of the claim appended hereto.

I claim:

A composition of matter comprising benzyl chloride containing impurities which normally catalyze auto-condensation and deterioration and a stabilizing amount of di-2-ethylhexylamine.

ROBERT M. THOMAS.

REFERENCES CITED

The following references are of record in the file of this patent:

UNITED STATES PATENTS

| Number | Name | Date |
|---|---|---|
| 1,255,618 | Lepine | Feb. 5, 1918 |
| 1,950,438 | Carothers et al. | Mar. 13, 1934 |
| 2,043,257 | Missbach | June 9, 1936 |
| 2,121,009 | Britton et al. | June 21, 1938 |
| 2,121,011 | Britton et al. | June 21, 1938 |
| 2,160,944 | Coleman et al. | June 6, 1939 |

FOREIGN PATENTS

| Number | Country | Date |
|---|---|---|
| 502,838 | Great Britain | Mar. 27, 1939 |
| 547,871 | Great Britain | Sept. 15, 1942 |

OTHER REFERENCES

Marvel et al.: "Jour. Am. Chem. Soc.," vol. 51, pages 3638–41 (1929).